(12) United States Patent
Sun

(10) Patent No.: US 8,405,970 B2
(45) Date of Patent: Mar. 26, 2013

(54) COMPUTER ENCLOSURE AND STORAGE DEVICE MODULE THEREOF

(75) Inventor: Zheng-Heng Sun, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 238 days.

(21) Appl. No.: 12/912,768

(22) Filed: Oct. 27, 2010

(65) Prior Publication Data

US 2012/0087081 A1    Apr. 12, 2012

(30) Foreign Application Priority Data

Oct. 6, 2010   (CN) .......................... 2010 1 0299010

(51) Int. Cl.
*G06F 1/16*      (2006.01)

(52) U.S. Cl. ........... 361/679.33; 248/220.31; 360/99.08; 345/204

(58) Field of Classification Search .................. 361/690, 361/679.33, 679.34, 679.06, 679.46, 679.37, 361/679.36, 679.39, 679.02, 679.48; 248/672, 248/316.7, 310, 636, 27.3, 201, 220.31, 221.11; 435/6; 360/97.19, 75, 256.2, 244.8, 923, 360/264.7, 99.08; 345/156, 588, 172, 76, 345/173, 204; 312/223.3, 332.1, 244, 270.3, 312/265.5

See application file for complete search history.

(56) References Cited

U.S. PATENT DOCUMENTS

| 8,023,258 B2 * | 9/2011 | Chen et al. ............... 361/679.33 |
| 2011/0059442 A1 * | 3/2011 | Luo et al. ........................ 435/6 |
| 2012/0155017 A1 * | 6/2012 | Tao et al. ................. 361/679.48 |

* cited by examiner

*Primary Examiner* — Hung Duong
(74) *Attorney, Agent, or Firm* — Altis Law Group, Inc.

(57) ABSTRACT

A computer enclosure includes a case and a storage device module. The case includes a drive bracket. The storage device includes a supporting frame, an adapter board, and a number of data storage devices. The supporting frame includes an inserting portion inserted and fixed in the drive bracket, and a receiving portion exposed outside of the case and connected to the inserting portion. The adapter board is arranged in receiving portion. The data storage devices are vertically inserted in the receiving portion and communicate with the adapter board.

6 Claims, 4 Drawing Sheets

COMPUTER ENCLOSURE AND STORAGE DEVICE MODULE THEREOF

BACKGROUND

1. Technical Field

The present disclosure relates to computer enclosures and, particularly, to a computer enclosure with a data storage device module.

2. Description of Related Art

A computer enclosure may include a drive bracket capable of housing three or more compact disc (CD) drives. However, more often than not, only one CD drive is installed, thus wasting space in the enclosure. Therefore there is room for improvement in the art.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
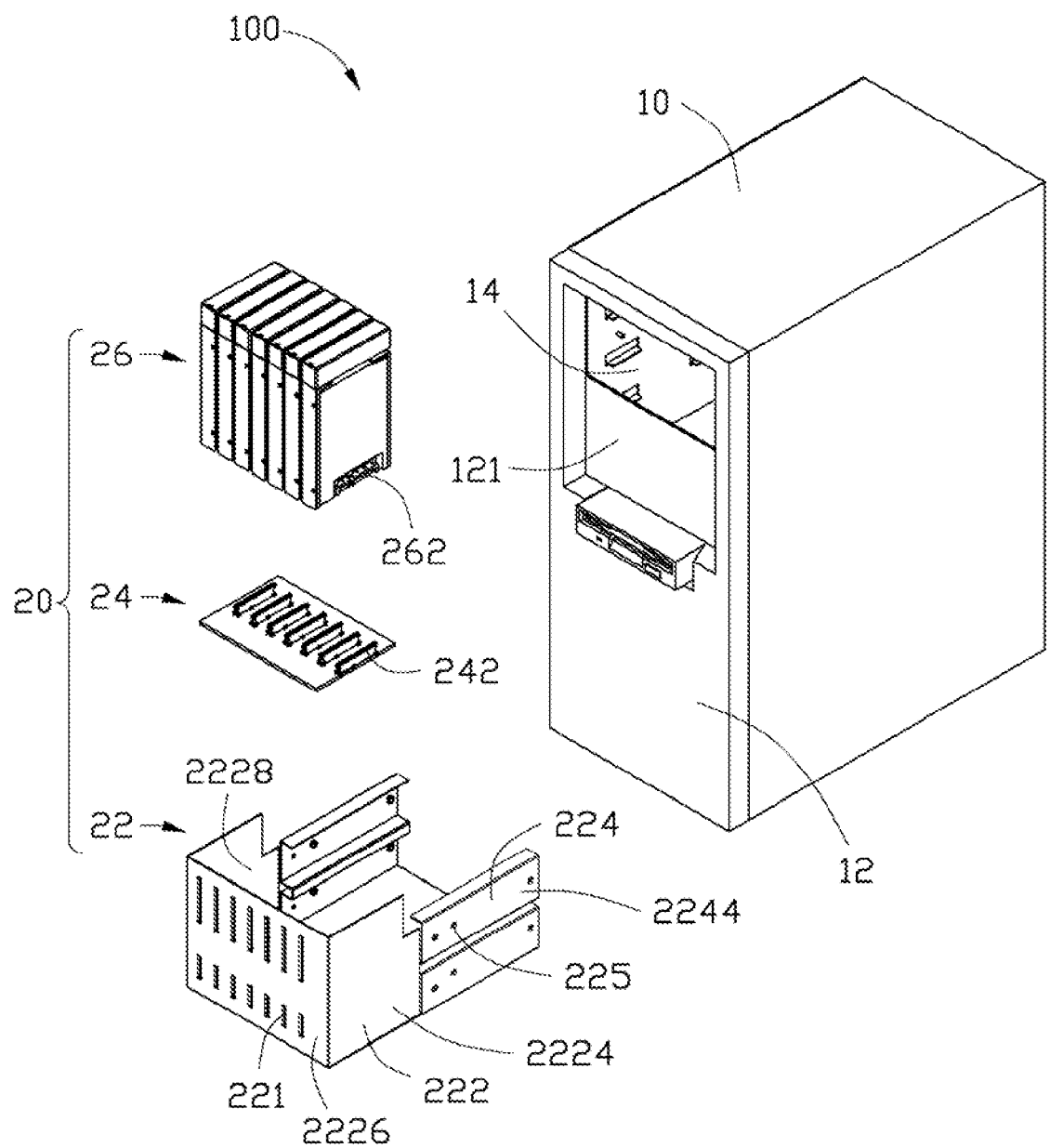
FIG. 1 is an exploded, isometric view of an embodiment of a computer enclosure.
Figure 2:
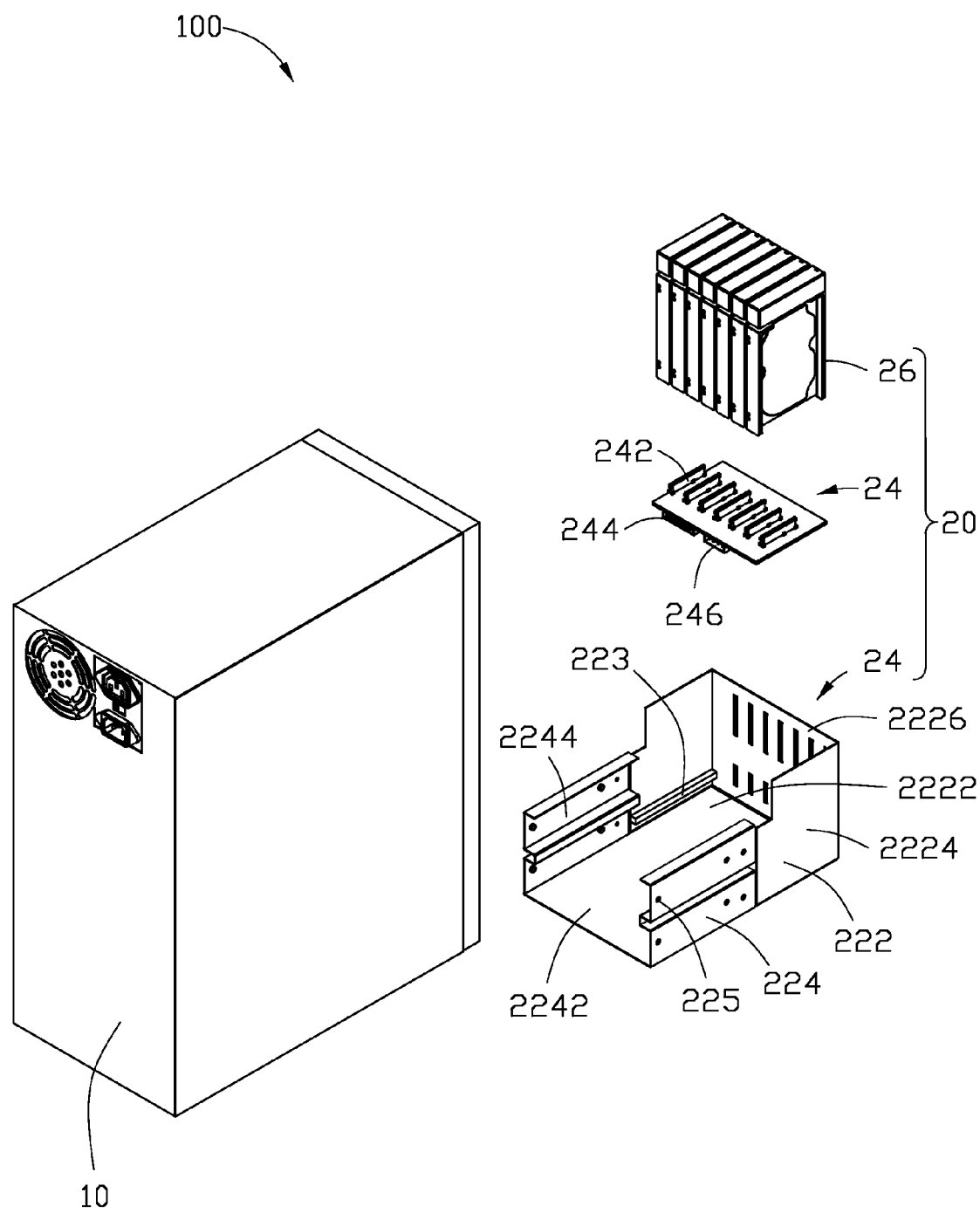
FIG. 2 is similar to FIG. 1, but viewed from another perspective.

Referring to FIGS. 1 and 2, an embodiment of a computer enclosure 100 includes a case 10 and a storage device module 20. The storage device module 20 may be a hard disk drive (HDD) module.

The case 10 includes a front panel 12 defining an opening 121 and a drive bracket 14 mounted on an upper portion of the front panel 12 aligned with the opening 121. The drive bracket 14 can house three compact disc (CD) drives (not shown), or house the storage device module 20 and a CD drive, which enter or exit from the drive bracket 14 through the opening 121. Mounting technology for the drive bracket 14 and the three CD drives is well known and thus not described here. In one embodiment, if only one CD drive is mounted in the drive bracket 14, the storage device module 20 can be mounted in the drive bracket 14 to fully utilize available space.

The storage device module 20 includes a supporting frame 22, an adapter board 24, and a number of data storage devices, such as HDDs 26 each including a power and data interface 262.

The adapter board 24 is a circuit board and includes a number of sockets 242 mounted on a top of the adapter board 24, for connecting to the power and data interfaces 262 of the HDDs 26. A data connector 244 and a power connector 246 are mounted on a bottom of the adapter board 24 opposite to the sockets 242, for connecting to a data cable of a motherboard and a power cable of a power supply (not shown) in the case 10. The sockets 242 are electrically connected to the data connector 244 and the power connector 246. When the power and data interfaces 262 of the HDDs 26 are connected to the sockets 242 of the adapter board 24, and the data connector 244 and the power connector 246 of the adapter board 24 are respectively connected to the data cable and the power cable, the HDDs 26 can communicate with the motherboard through the adapter board 24.

The supporting frame 22 is a hollow rectangular frame that includes a receiving portion 222 and an inserting portion 224 connected to the receiving portion 222. The receiving portion 222 includes a bottom wall 2222, two sidewalls 2224 perpendicularly extending from opposite sides of the bottom wall 2222, and an end wall 2226 perpendicularly extending from an end of the bottom wall 2222. The receiving portion 222 defines an excess 2228 in a top side of the receiving portion 222. Two long blocks 223 respectively extend from lower portions of the sidewalls 2224, parallel and adjacent to the bottom wall 2222. The distance between the blocks 223 and the bottom wall 2222 is greater than the thickness of the board of the adapter board 24 and the thickness of the larger one of the data connector 244 and the power connector 246 combined. Namely, the adapter board 24 can be inserted under and held in place by the blocks 221. In one embodiment, to achieve a good heat dissipation effect, a number of through holes 221 are defined in the end wall 2226.

The inserting portion 224 includes a bottom wall 2242 connected to and coplanar with the bottom wall 2222 of the receiving portion 222 and two sidewalls 2244 perpendicularly extending from opposite sides of the bottom wall 2242. Each sidewall 2244 defines a number of screw holes 225. The inserting portion 224 can be inserted into the drive bracket 14 and fixed in the drive bracket 14 by screws (not shown) extended through the drive bracket 14 and screwed into the screw holes 225.

Figure 3:
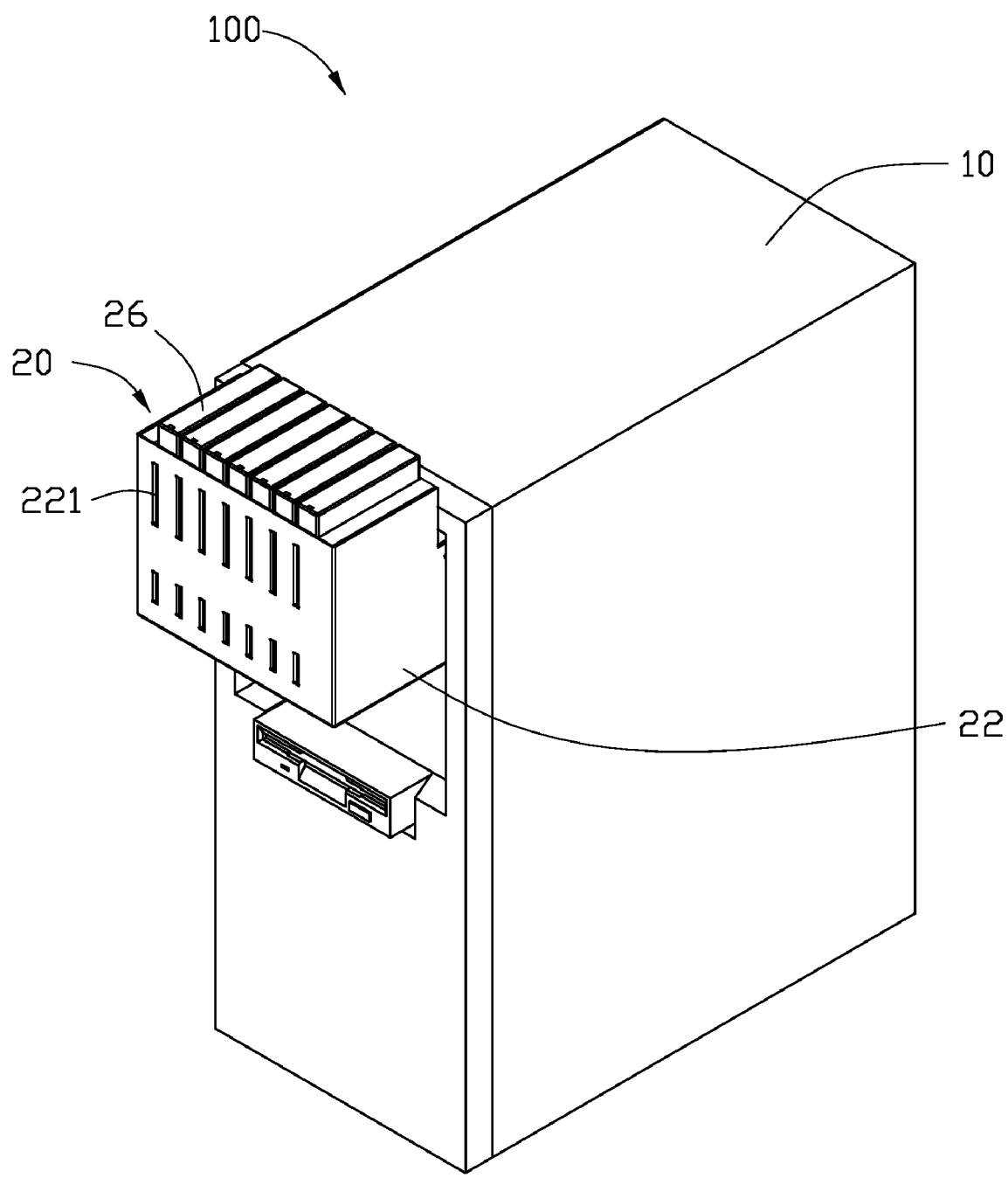
FIG. 3 is an assembled, isometric view of the computer enclosure of FIG. 1.

Referring to FIG. 3, in assembly, the adapter board 24 is inserted under the blocks 223. The inserting portion 224 is inserted into the drive bracket 14 through the opening 121 of the from panel 12 and fixed in the drive bracket 14. The HDDs 26 are inserted into the receiving portion 222 of the supporting frame 22 through the access 2228 and perpendicularly mounted to the adapter board 24 by the power and data interfaces 262 being inserted into the sockets 242 of the adapter board 24. In use, the data connector 244 and the power connector 246 of the adapter board 24 are respectively connected to the data cable of the motherboard and the power cable of the power supply. The storage device module 20 is arranged in available space of the drive bracket 14 of the computer enclosure 100, which efficiently utilizes the space of the computer enclosure 100.

Figure 4:
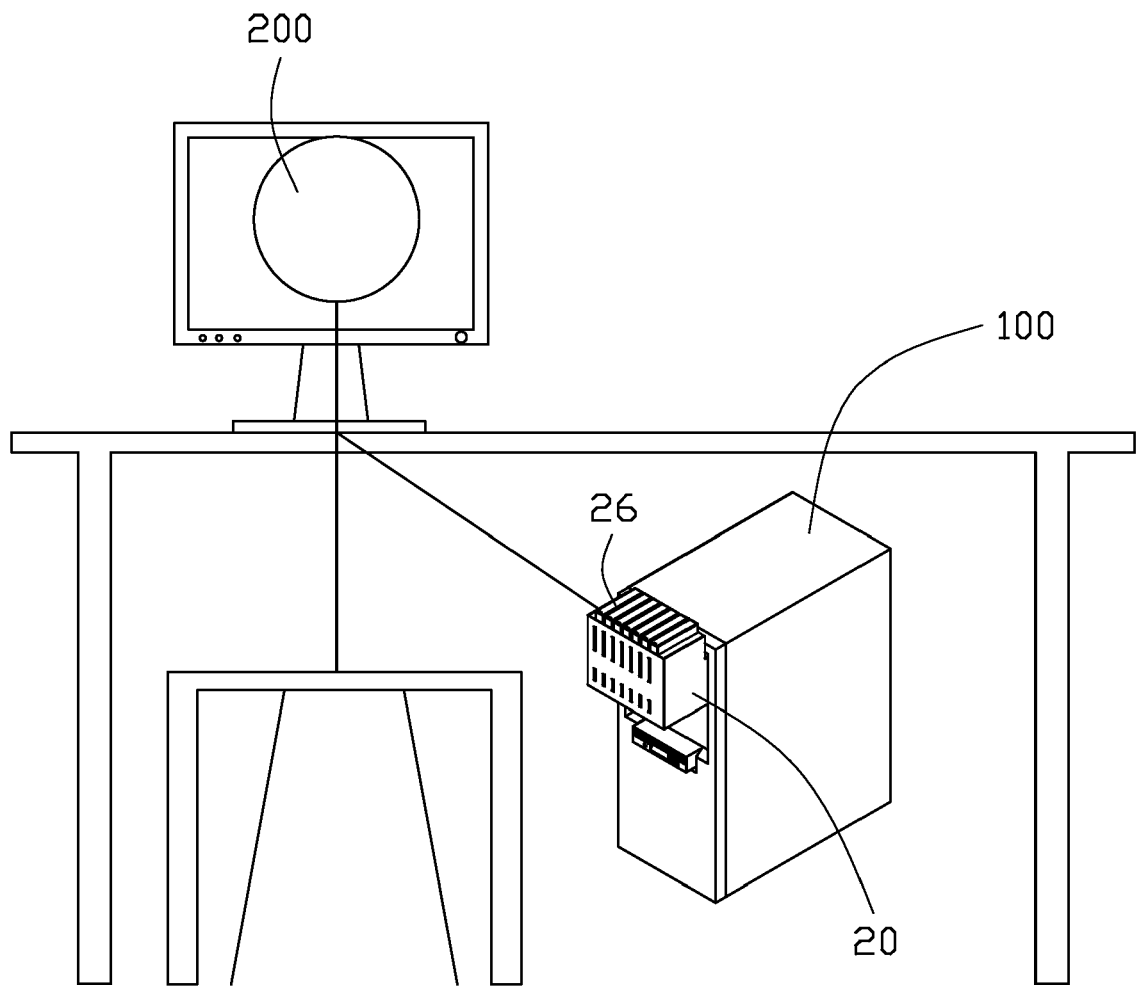
FIG. 4 is an isometric, schematic view of the computer enclosure of FIG. 3 operating, together with a display, a desk, and a chair.

Referring to FIG. 4, a user 200 can vertically insert the HDDs 26 into the sockets 242 of the adapter board 24, without having to lean over or stoop to operate the HDDs 26, which is very convenient.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A computer enclosure, comprising:
a case comprising a front panel defining an opening and a drive bracket aligned with the opening, the drive bracket being operable to house a plurality of compact disc drives; and
a storage device module partially mounted in the drive bracket and occupying space for some of the plurality of compact disc drives in the drive bracket, the storage device module comprising:
a supporting frame comprising an inserting portion inserted and fixed in the drive bracket and a receiving portion exposed outside of the case and connected to the inserting portion, the inserting portion entering and exiting from the drive bracket through the opening of the case, the receiving portion defines an access in a top side of the receiving portion substantially perpendicular to the front panel of the case;
an adapter board arranged in receiving portion; and
a plurality of data storage devices inserted in the receiving portion through the access, and communicating with the adapter board without entering the case.

2. The computer enclosure of claim 1, wherein the adapter board is a circuit board, and comprises a plurality of sockets mounted on a top of the adapter board, for connecting power and data interfaces of the plurality of data storage devices, a data connector and a power connector are mounted on a bottom of the adapter board opposite to the plurality of sockets.

3. The computer enclosure of claim 1, wherein the inserting portion comprises a first bottom wall and two first sidewalls substantially perpendicularly extending from opposite sides of the first bottom wall, the first sidewalk define a plurality of screw holes for fixing the inserting portion in the drive bracket.

4. The computer enclosure of claim 3, wherein the receiving portion comprises a second bottom wall connected to the first bottom wall of the inserting portion, two second sidewalk substantially perpendicularly extending from opposite sides of the second bottom wall, and an end wall substantially perpendicularly extending from an end of the second bottom wall.

5. The computer enclosure of claim 4, wherein the receiving portion further comprises two blocks respectively extending from the second sidewalk of the receiving portion, parallel and adjacent to the second bottom wall of the receiving portion, the adapter board is inserted under the blocks.

6. The computer enclosure of claim 1, wherein the plurality of data storage devices is vertically inserted in the receiving portion.

* * * * *